United States Patent [19]

Hinschlager

[11] Patent Number: 5,003,840
[45] Date of Patent: Apr. 2, 1991

[54] COVER FOR THE DRIVING SPROCKET OF A BICYCLE

[75] Inventor: Robert A. Hinschlager, Mendon, Ohio

[73] Assignee: Huffy Corporation, Miamisburg, Ohio

[21] Appl. No.: 432,253

[22] Filed: Nov. 6, 1989

[51] Int. Cl.⁵ .................... G05G 1/14; F16H 55/30; B62J 13/00
[52] U.S. Cl. .................... 74/594.2; 74/609; 474/144; 474/140; 280/152.1
[58] Field of Search ............ 74/594.2, 609; 474/144, 474/140; 280/160.1, 152.1

[56] References Cited

U.S. PATENT DOCUMENTS

| | | | |
|---|---|---|---|
| 4,240,303 | 12/1980 | Mosley | 474/144 |
| 4,439,172 | 3/1984 | Segawa | 74/594.2 |
| 4,487,424 | 12/1984 | Ellis | 74/594.2 |
| 4,594,910 | 6/1986 | Nagano | 74/594.2 |

FOREIGN PATENT DOCUMENTS

| | | | |
|---|---|---|---|
| 2479766 | 10/1981 | France | 474/144 |
| 0173648 | 10/1982 | Japan | 474/140 |
| 0444088 | 3/1936 | United Kingdom | 74/609 |

OTHER PUBLICATIONS

Express LE Man's Bike—published 1986.
Techtra Lady's Bike—published 1986.
Model No. 36688 Man's Bike—published 1987.

*Primary Examiner*—Leslie A. Braun
*Assistant Examiner*—Winnie Yip
*Attorney, Agent, or Firm*—Biebel, French & Nauman

[57] ABSTRACT

A bicycle sprocket cover is formed as a unitarian molded disk of sufficient diameter to overlie and project radially outwardly beyond the teeth of a bicycle drive sprocket. The cover is attached to the sprocket by bolts, the heads of which are then covered by decorative panels having outwardly projecting tabs that are received in complimentary slots formed in the sprocket cover.

7 Claims, 3 Drawing Sheets

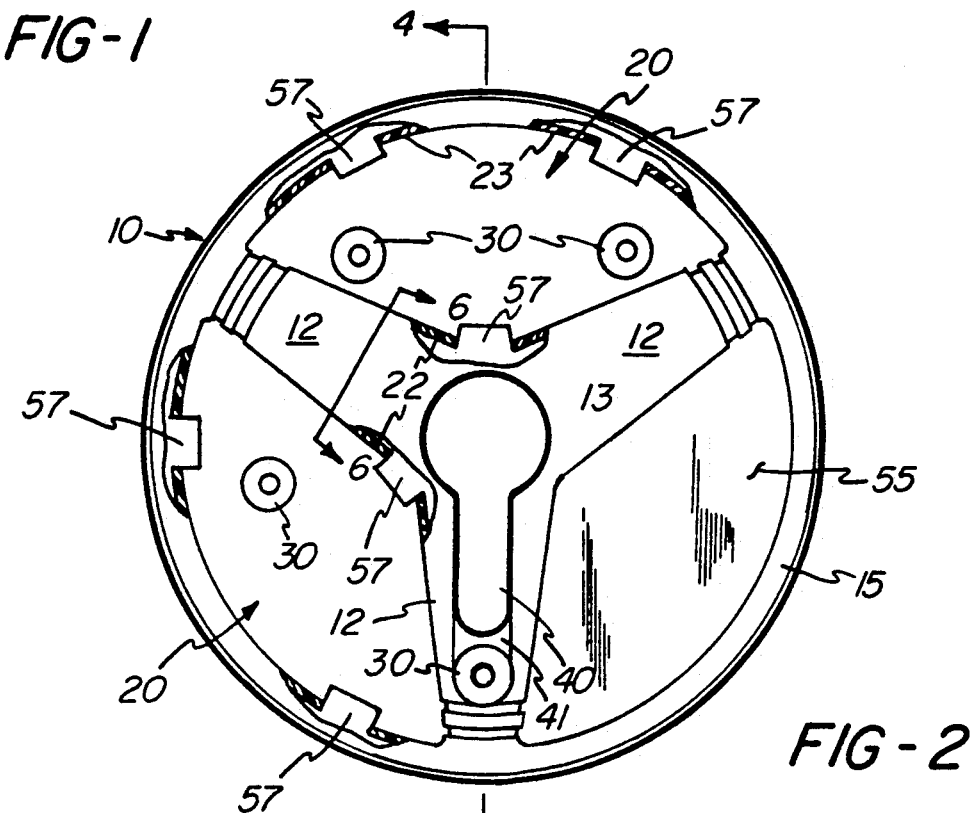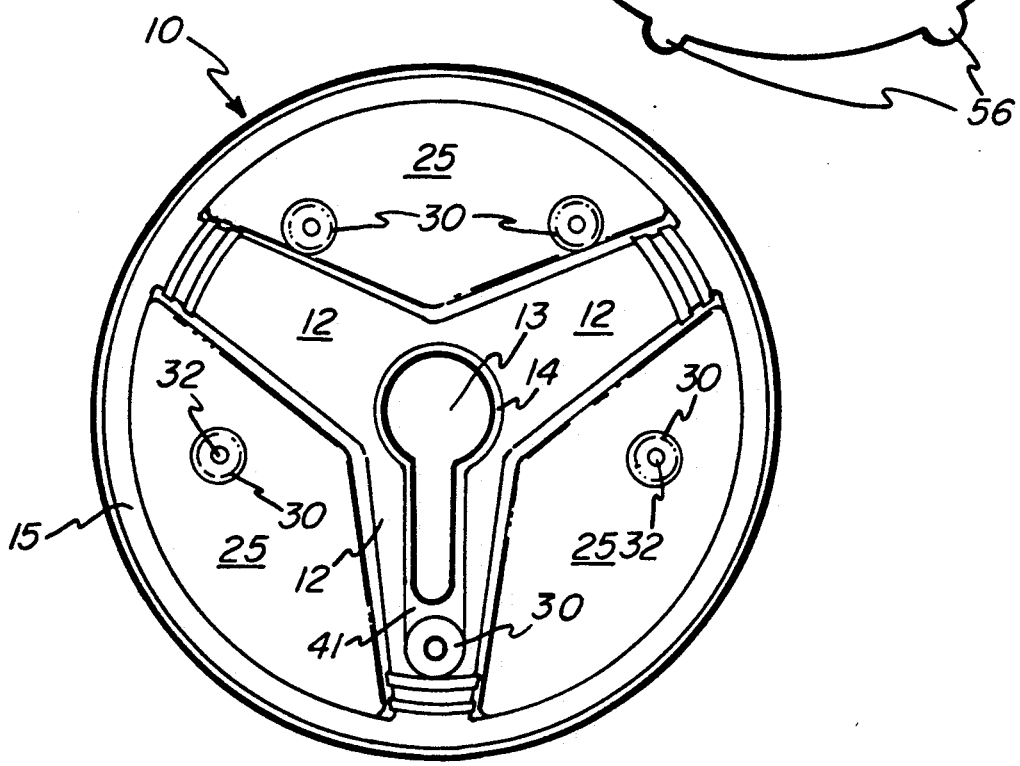

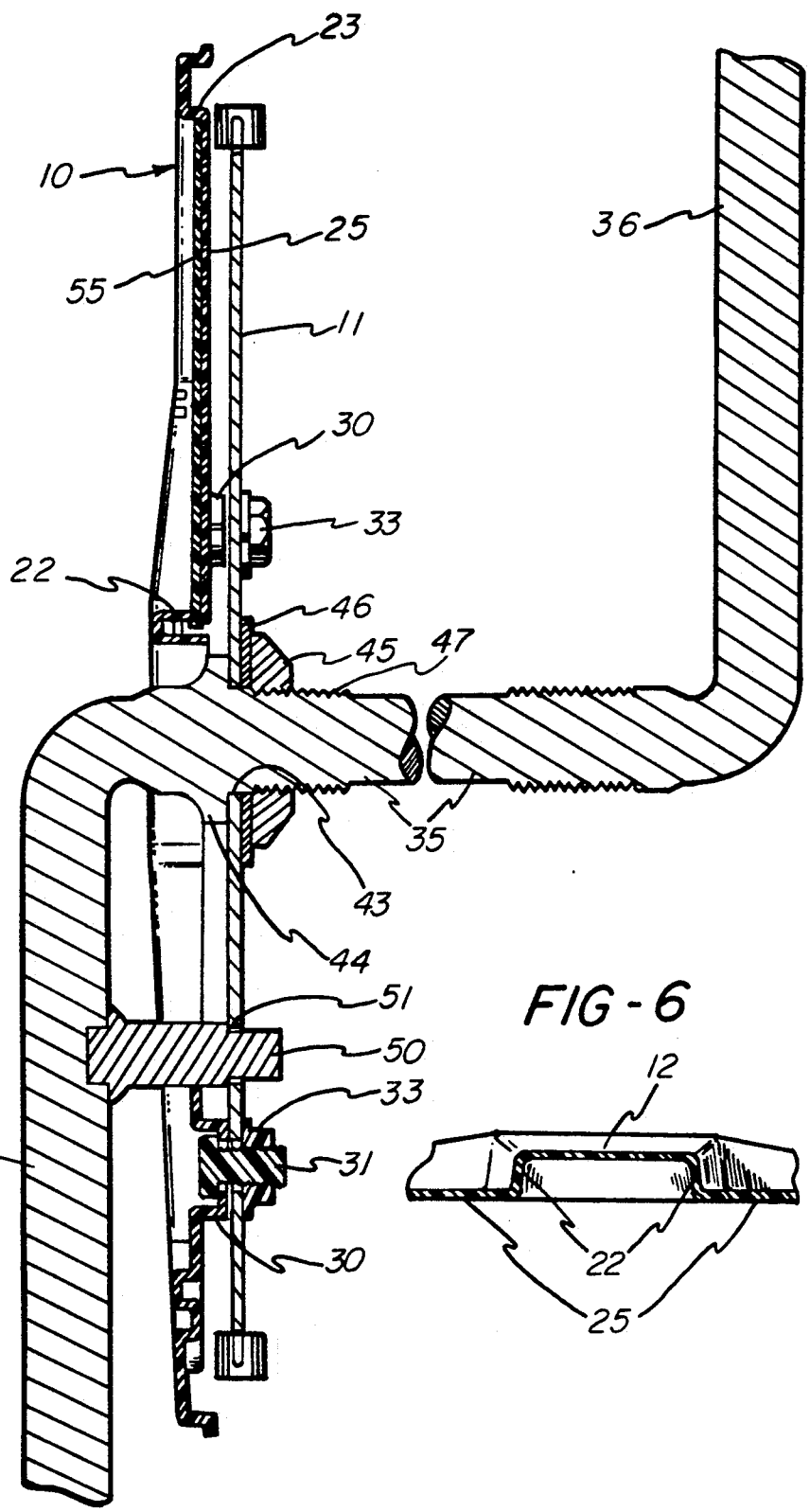

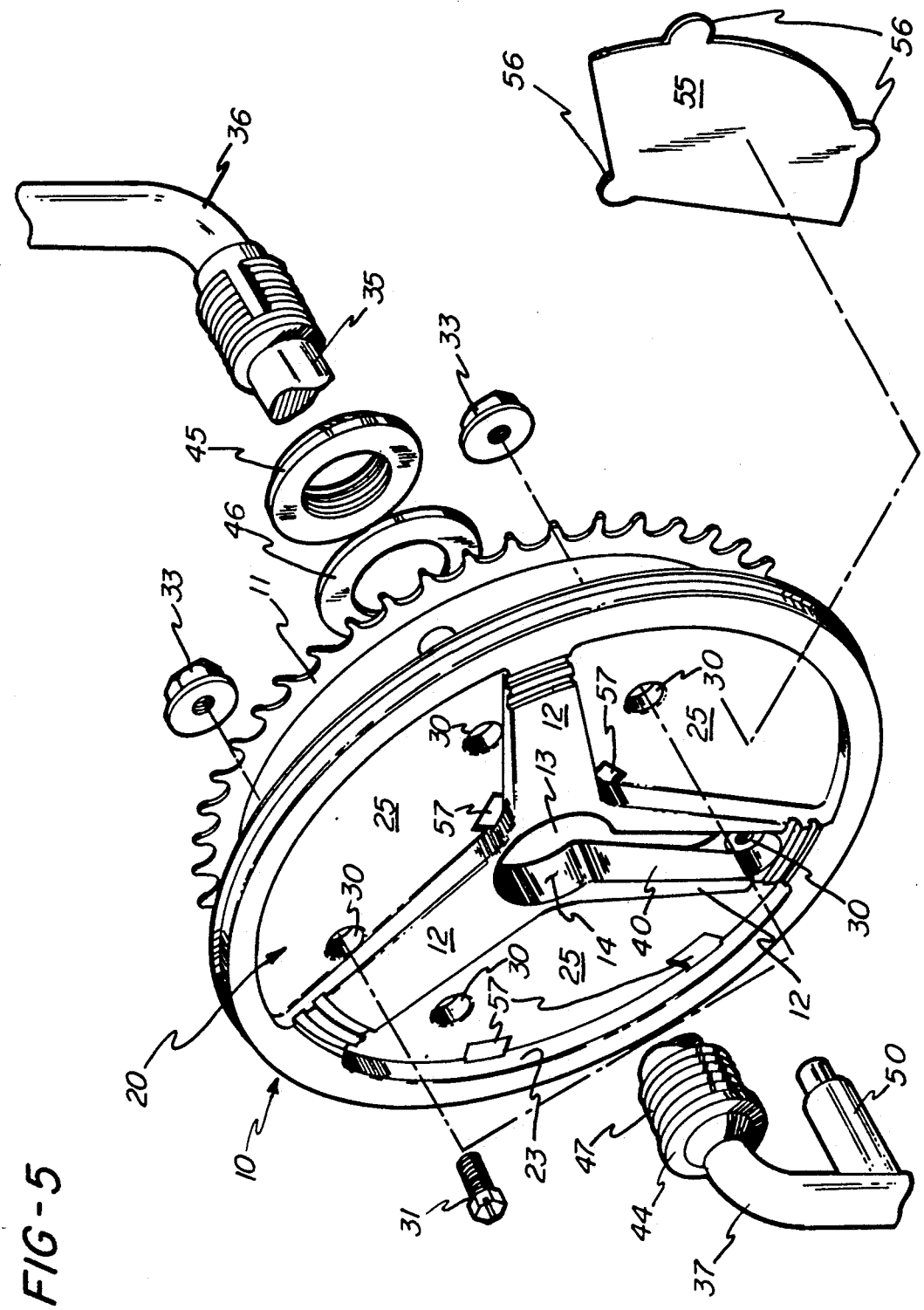

5,003,840

COVER FOR THE DRIVING SPROCKET OF A BICYCLE

CROSS-REFERENCE TO RELATED APPLICATION

Cross-reference is made to applicant's pending design patent application, Ser. No. 432,277, filed on even date herewith.

BACKGROUND OF THE INVENTION

It has long been customary in bicycle manufacture to provide a cover—sometimes in the form of a chain guard—for the driving sprocket of a bicycle. Generally, such covers or guards have been primarily utilitarian in design and have made little or no contribution to the overall appearance or attractiveness of the bicycle. The present invention therefore has as its primary objective the provision of a bicycle sprocket cover which makes a major contribution to the attractiveness of a bicycle in addition to providing proper protection for the sprocket and chain.

SUMMARY OF THE INVENTION

A sprocket cover in accordance with the invention comprises a unitary, molded disk of a suitable plastic material which is of sufficient diameter to overlie and project radially beyond the face of the driving sprocket of a bicycle. This disk comprises a plurality of spoke portions radiating from a central aperture which receives the crankshaft of a bicycle, and a peripheral rim portion integrally connected with the radially outer ends of the spoke portions. The disk is molded to a three-dimensional configuration to provide a recessed pocket between each pair of spoke portions and the rim, with each of these pockets having a back wall.

In order to mount the disk on a sprocket, each of the back walls includes one or more integral socket portions, each of which is sized to receive and retain the head of a bolt having a threaded portion that extends through a hole in the inner end of the socket for attachment to a sprocket. In addition, the sprocket cover includes a decorative panel sized to be removably received in each of its pockets in covering and concealing relation with the sockets and bolt heads carried by the back walls of the pockets. In accordance with the above application for design patent, these panels are suitably colored or otherwise decorated to contribute an overall decorative appearance to the sprocket cover in addition to their function in concealing the mounting for the sprocket.

Other objects and advantages of the invention, and specific details of construction by which these objects and advantages are achieved, are disclosed in or apparent from the description of the preferred embodiment of the invention which follows.

BRIEF DESCRIPTION OF THE DRAWINGS

FIG. 1 is a front elevational view of a sprocket cover in accordance with the invention, with one of its component panels in place;

FIG. 2 is a detailed view of one of the decorative panels for the sprocket cover of FIG. 1;

FIG. 3 is an elevational view of the back or inner side of the sprocket cover of FIG. 1;

FIG. 4 is an enlarged section, taken generally on the line 4—4 of FIG. 1, showing a sprocket cover in accordance with the invention mounted on the sprocket wheel of a bicycle;

FIG. 5 is an exploded perspective view of the mounted sprocket cover shown in FIG. 4; and FIG. 6 is a fragmentary section on the line 6—6 in FIG. 1.

DESCRIPTION OF THE PREFERRED EMBODIMENT

The sprocket cover shown in the drawings comprises a main body 10 of circular shape and sufficiently greater outer diameter than the driving sprocket 11 of a bicycle with which it is to be used that it overlies and conceals the sprocket when viewed from the side of the bicycle. For example, if the maximum diameter of the sprocket 11 is approximately 7.25 inches, the outside diameter of the main body 10 may be 7.75 inches.

The main body 10 is readily molded as a unitary piece from a suitable plastic such as ABS in a thickness of 0.060 ml, and it includes three spoke portions 12 radiating from a central opening 13 which is largely circular and surrounded by a correspondingly partial cylindrical rim 14, but it also includes a slot portion centered on one of the spoke portions 12. The spoke portions 12 are connected at their outer ends by an integral rim portion 15 so that each pair of spoke portions 12 and the portion of rim 15 by which they are connected cooperate to define a generally sector-shaped space 20.

The spoke portions 12 are of channel shape in section to provide them with side walls 22 that extend axially of the body 10, and the rim 15 has a similar radially integrally connected to the side walls 22 and rim wall 23 to form the backs of the respective sector-shaped spaces 20 and thereby to convert them into shallow pockets.

Each of these back walls 25 includes one or more socket portions 30 projecting rearwardly therefrom to receive and retain the head of a bolt 31 having a threaded stem portion which extends through a hole 32 in the bottom of each socket 30. The sockets 30 are spaced to align with holes in the sprocket 11 for receiving the mounting bolts 31, each of which is provided with a nut 33 on its threaded end.

FIGS. 4 and 5 illustrate how the sprocket cover of the invention is mounted on the drive sprocket 11 of a bicycle which is in turn secured on a crankshaft 35 having pedal arms 36 and 37 projecting from its outer ends. In addition to the central hole 13, the body 10 includes a trough-like portion 40 in one of its spokes 12, with the radially inner portion of this trough having no bottom, but its radially outer portion has a bottom wall 41 which includes one of the sockets 30.

In assembling a sprocket cover of the invention on a bicycle, the first step is to mount the body 10 on the sprocket 11 by means of the bolts 31 and nuts 33. The central hole 13 in the sprocket cover body 10, and the corresponding center hole 43 in sprocket 11, are of sufficient diameter to receive therethrough the pedal arm 36 at the left-hand side of the bicycle and the crankshaft 35 until the sprocket meets a circumferential shoulder 44 near the other pedal arm 37. The parts are then locked in position by a nut 45 and washer 46 on the threaded portion 47 of the crankshaft in-board of the shoulder 44. of the crankshaft in-board of the shoulder 44.

In addition to the clamping action of the nut 45, the sprocket 11 is also held against turning on the crankshaft 35 by a drive pin 50 secured on the inside of the right-hand pedal arm 37 and projecting through the extension of the hole 13 in the sprocket cover and a hole 51 in the sprocket 11.

When the sprocket cover is thus mounted on a bicycle, it will initially appear as shown at the top on the left side in FIG. 1, namely with the sockets 30 and bolt heads 31 visible. In order to conceal these mechanical parts of the assembly, and also to contribute a decorative appearance to the sprocket cover, a panel 55 is removably mounted in each of the pockets 20. As shown in FIG. 2, each panel 55 is of a sector shape and sized to fit snugly in one of the pockets 20. In addition, each panel 55 is provided with three outwardly extending tabs 56, two on its curved edge and one between its straight edges, which fit in slots 57 at the junction of each back wall 25 with the surrounding wall portions 22 and 23 of the spokes 12 and rim 15 and cooperate with slots 57 to provide means forming a releasable connection between each panel 55 and the main body 10.

In the preferred practice of the invention, the panels 55 comprise a hard plastic material, such as high impact styrene, of sufficient thickness to provide them with rigidity but enough flexibility to provide for each panel being temporarily bowed while the last of its tabs 56 is being inserted in its slot 57, for example, a thickness of 0.040 inch. These panels 55 may be of any desired contrasting color with respect to the main body 10, and also with respect to each other in order to create a corresponding pattern of movement when the bicycle is in motion, and since of the bicycle may have multiple sets of the panels in different colors.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. For use on a bicycle having a driving socket of predetermined diameter mounted on a crankshaft, a cover for such sprocket comprising:
   (a) a main body of circular shape proportioned to overlie such sprocket and having an outer face,
   (b) said body including a plurality of spoke portions radiating outwardly from a central hub portion and having radially outer ends,
   (c) said spoke portions being of channel shape in section to provide side walls thereon,
   (d) said hub portion having a central hole therethrough for receiving said crankshaft,
   (e) said body also including a peripheral rim portion connected with said radially outer ends of said spoke portions and cooperating therewith to define a plurality of open areas,
   (f) said rim portion having a rearwardly extending radially inner side wall,
   (g) said body including a wall portion which forms a back for each of said open areas and is connected with said side walls of adjacent said spoke portions and said rim portions to define therewith a corresponding series of pockets in said outer face of said body;
   (h) means for mounting said body on such driving sprocket, and
   (i) a panel mounted in each of said pockets.

2. A sprocket cover as defined in claim 1 further comprising means forming a releasable connection between each of said panels and said main body.

3. A sprocket cover as defined in claim 1 further characterized in that each of said panels comprises a sheet member having a plurality of tab portions projecting therefrom in coplanar relation with the remainder of said sheet member, and said side walls of said spoke portions and said rim portion have slots therein for receiving said tab portions to secure said panels removably in said pockets.

4. A sprocket cover as defined in claim 1 characterized in that said means for mounting said body on a sprocket comprises holes in said back wall portions for receiving bolts therethrough for securing said body to a sprocket, and said panels cover and conceal said holes.

5. For use on a bicycle having a driving socket of predetermined diameter mounted on a crankshaft, a cover for such sprocket comprising:
   (a) a main body of circular shape proportioned to overlie such sprocket and having an outer face,
   (b) said body including a plurality of spoke portions radiating outwardly from a central hub portion and having radially outer ends,
   (c) said spoke portions being of channel shape in section to provide side walls thereon,
   (d) said hub portion having a central hole therethrough for receiving said crankshaft,
   (e) said body also including a peripheral rim portion connected with said radially outer ends of said spoke portions and cooperating therewith to define a plurality of open areas in said outer face of said body,
   (f) said rim portion having a rearwardly extending radially inner side wall,
   (g) said body including a wall portion which forms a back for each of said open areas and is connected with said side walls of adjacent said spoke portions and said rim portion by axially extending wall portions to define therewith a corresponding series of pockets,
   (h) each of said back wall portions including a socket projecting rearwardly therefrom and having an inner end wall provided with a hole therethrough for receiving a bolt having a head for securing said body to a sprocket,
   (i) each of said sprockets being proportioned to contain the head of such bolt, and
   (j) a panel mounted in each of said pockets in covering relation with said socket therein.

6. A sprocket cover as defined in claim 5 further comprising means forming a releasable connection between said panels and said main body.

7. A sprocket cover as defined in claim 5 further characterized in that each of said panels comprises a sheet member having a plurality of tab portions projecting therefrom in coplanar relation with said sheet member, and said side walls of said spoke portions and said rim portion have slots therein for receiving said tab portions to secure said panels removably in said pockets.

* * * * *

UNITED STATES PATENT AND TRADEMARK OFFICE
CERTIFICATE OF CORRECTION

PATENT NO. : 5,003,840
DATED : April 2, 1991
INVENTOR(S) : Robert A. Hinschlager It is certified that error appears in the above-identified patent and that said Letters Patent is hereby corrected as shown below:

Column 3, line 59, "portions" should be --portion--.

Column 4, line 8, "the remainder of" should be deleted; line 18, "socket" should be --sprocket--; line 48, "sprockets" should be --sockets--.

Signed and Sealed this

Eleventh Day of August, 1992

Attest:

DOUGLAS B. COMER

*Attesting Officer*  *Acting Commissioner of Patents and Trademarks*